US012077311B1

(12) United States Patent
Smith et al.

(10) Patent No.: US 12,077,311 B1
(45) Date of Patent: Sep. 3, 2024

(54) AIRCRAFT PROPULSION SYSTEM WITH TURBINE ENGINE AND EXHAUST CONDENSER

(71) Applicant: Pratt & Whitney Canada Corp., Longueuil (CA)

(72) Inventors: Scott Smith, St-Lambert (CA); Russell Stratton, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/211,130

(22) Filed: Jun. 16, 2023

(51) Int. Cl.
*B64D 33/04* (2006.01)
*F02K 1/82* (2006.01)

(52) U.S. Cl.
CPC .............. *B64D 33/04* (2013.01); *F02K 1/822* (2013.01)

(58) Field of Classification Search
CPC ................................ B64D 33/04; F02K 1/822
See application file for complete search history.

(56) References Cited

U.S. PATENT DOCUMENTS

| 2,160,281 A * | 5/1939 | Price ...................... B64D 27/02 244/207 |
| 4,869,313 A | 9/1989 | Fredley |
| 4,899,810 A | 2/1990 | Fredley |
| 7,971,438 B2 * | 7/2011 | Taylor ....................... F02C 7/10 60/39.511 |
| 2021/0207500 A1* | 7/2021 | Klingels ................. F01K 23/10 |
| 2023/0150678 A1* | 5/2023 | Klingels .............. B01D 5/0081 244/55 |

* cited by examiner

*Primary Examiner* — Lorne E Meade
(74) *Attorney, Agent, or Firm* — Getz Balich LLC (57) ABSTRACT

An aircraft propulsion system is provided that includes a turbine engine and an exhaust gas condenser. The exhaust gas condenser includes a housing, a nozzle, air scoops, a bank of exhaust gas conduits, and a center collection channel. The housing includes an interior cavity, top and bottom sides, and first and second lateral sides. The bank of exhaust gas conduits is disposed in the interior cavity of the housing and includes exhaust gas conduits and bypass air passages. The exhaust gas conduits and bypass air passages are disposed in an alternating configuration. The center collection channel is disposed radially inside of the bank of exhaust conduits. The exhaust gas conduits and bypass air passages extend spirally along the central axis between the forward and aft ends. Each bypass air passage is in fluid communication with an air scoop and the center collection channel.

20 Claims, 8 Drawing Sheets

FIG. 9

AIRCRAFT PROPULSION SYSTEM WITH TURBINE ENGINE AND EXHAUST CONDENSER

BACKGROUND OF THE INVENTION

1. Technical Field

This disclosure relates to an aircraft in general, and to a turbine engine system for an aircraft in particular.

2. Background Information

There is interest in alternative fuels for gas turbine engines. There is interest, for example, in fueling a gas turbine engine with hydrogen rather than a traditional hydrocarbon fuel such as kerosine to reduce greenhouse emissions. Various systems and methods are known in the art for fueling a gas turbine engine with hydrogen. While these known systems and methods have various advantages, there is still room in the art for improvement.

SUMMARY

According to an aspect of the present disclosure, an aircraft propulsion system is provided that includes a turbine engine and an exhaust gas condenser. The turbine engine is configured to exhaust gases during combustion, which exhaust gases may include water vapor. The exhaust gas condenser extends lengthwise along a central axis, and includes a housing, a nozzle, a plurality of air scoops, a bank of exhaust gas conduits, and a center collection channel. The housing extends lengthwise between forward and aft ends, and includes an interior cavity, a top side, a bottom side opposite the top side, a first lateral side, and a second lateral side opposite the first lateral side. The first and second lateral sides extend between the top and bottom sides. The nozzle is in communication with the housing and is disposed at the aft end. The air scoops are attached to the housing. The bank of exhaust gas conduits is disposed in the interior cavity of the housing. The bank of exhaust gas conduits includes a plurality of exhaust gas conduits and a plurality of bypass air passages. The exhaust gas conduits and the bypass air passages are disposed relative to one another in an alternating configuration. The center collection channel is disposed radially inside of the bank of exhaust conduits, and is in fluid communication with the nozzle. The exhaust gas conduits and bypass air passages extend spirally along the central axis between the forward and aft ends. The exhaust gas conduits are open at the forward end to receive the exhaust gases from the turbine engine and are open at the nozzle. Each bypass air passage is in fluid communication with an air scoop and in fluid communication with the center collection channel.

In any of the aspects or embodiments described above and herein, the exhaust gas condenser may be configured to keep the exhaust gases separate from the bypass air.

In any of the aspects or embodiments described above and herein, the nozzle may include an annular exhaust gas portion and a bypass air portion, and the exhaust gas conduits may be in fluid communication with the annular exhaust gas portion of the nozzle and the annular exhaust gas nozzle portion may be configured to maintain the exhaust gases separate from the bypass air within the nozzle, and the center collection channel may be in fluid communication with the bypass air portion of the nozzle and the bypass air portion may be configured to maintain the bypass air separate from the exhaust gases within the nozzle.

In any of the aspects or embodiments described above and herein, the air scoops attached to the housing may include a first lateral side (FLS) air scoop disposed on the first lateral side of the housing, and a second lateral side (SLS) air scoop disposed on the second lateral side of the housing.

In any of the aspects or embodiments described above and herein, the housing has a length, a width, and a height, and the FLS air scoop may have a FLS opening disposed proximate to the forward end, and the FLS air scoop may taper inwardly toward the central axis in a direction from the forward end to the aft end, and the SLS air scoop may have an SLS opening disposed proximate to the forward end, and the SLS air scoop may taper inwardly toward the central axis in a direction from the forward end to the aft end.

In any of the aspects or embodiments described above and herein, the SLS air scoop may extend the length of the housing, and the FLS air scoop may extend the length of the housing.

In any of the aspects or embodiments described above and herein, the SLS air scoop may extend the height of the housing, and the FLS air scoop may extend the height of the housing.

In any of the aspects or embodiments described above and herein, the FLS air scoop may have a FLS flow area that decreases in a direction from the forward end to the aft end, and the SLS air scoop may have an SLS flow area that decreases in a direction from the forward end to the aft end.

In any of the aspects or embodiments described above and herein, the plurality of air scoops attached to the housing may include a bottom side (BS) air scoop disposed on the bottom side of the housing.

In any of the aspects or embodiments described above and herein, the housing has a length, a width, and a height, and the BS air scoop may have a BS opening disposed proximate to the forward end, and the BS air scoop may taper inwardly toward the central axis in a direction from the forward end to the aft end.

In any of the aspects or embodiments described above and herein, the BS air scoop may extend the length and width of the housing.

In any of the aspects or embodiments described above and herein, the BS air scoop may have a BS flow area that decreases in a direction from the forward end to the aft end.

In any of the aspects or embodiments described above and herein, the exhaust gas condenser may include a plurality of heat transfer features that extend into one or more of the exhaust gas conduits, and the plurality of heat transfer features may structurally reinforce an exhaust gas conduits.

In any of the aspects or embodiments described above and herein, the exhaust gas condenser may include at least one flow guidance feature that extends into an exhaust gas conduit.

In any of the aspects or embodiments described above and herein, the exhaust gas condenser may include a plurality of heat transfer features that extend into a bypass air passage.

In any of the aspects or embodiments described above and herein, the exhaust gas condenser may include at least one flow guidance feature that extends into a bypass air passage.

According to an aspect of the present disclosure, an exhaust gas condenser for an aircraft turbine engine is provided. The exhaust gas condenser extends along a central axis. The exhaust gas condenser includes a housing, a nozzle, a plurality of air scoops, a bank of exhaust gas conduits, and a center collection channel. The housing extends lengthwise between forward and aft ends, and has an interior cavity and a plurality of sides that extend between the forward and aft ends. The nozzle is in communication with the housing and is disposed at the aft end. The air scoops are attached to the housing. The bank of exhaust gas conduits is disposed in the interior cavity of the housing. The bank of exhaust gas conduits includes a plurality of exhaust gas conduits and a plurality of bypass air passages. The exhaust gas conduits and the bypass air passages are disposed relative to one another in an alternating configuration. The center collection channel is disposed radially inside of the bank of exhaust conduits. The center collection channel is in fluid communication with the nozzle. The exhaust gas conduits and the plurality of bypass air passages extend spirally along the central axis between the forward and aft ends. The exhaust gas conduits are open at the forward end to receive the exhaust gases from the turbine engine and open at the nozzle. Each bypass air passage is in fluid communication with an air scoop and the bypass air passages are in fluid communication with the center collection channel.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
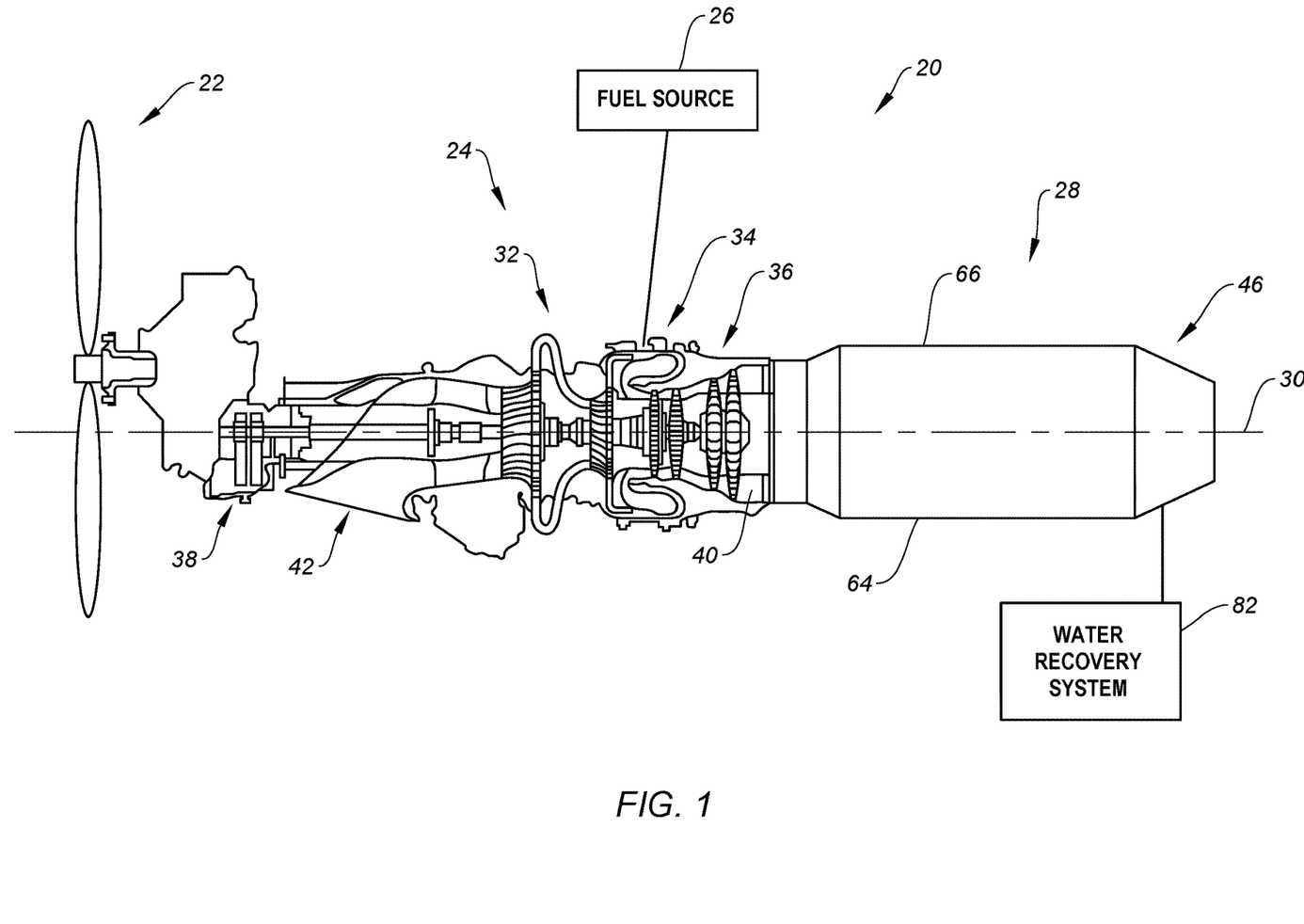
FIG. 1 is a diagrammatic partially sectioned view of a present disclosure propulsion system.

FIG. 1 diagrammatically illustrates a propulsion system 20 for an aircraft. The aircraft may be an airplane, a helicopter, a drone (e.g., an unmanned aerial vehicle (UAV)) or any other manned or unmanned aerial vehicle or system. The propulsion system 20 shown in FIG. 1 includes a propulsor rotor 22, a turbine engine 24, a fuel source 26, and an exhaust gas condenser 28. Non-limiting examples of a propulsor rotor 22 include a propeller rotor for a turboprop propulsion system, a rotorcraft rotor (e.g., a main helicopter rotor) for a turboshaft propulsion system, a propfan rotor for a propfan propulsion system, a pusher fan rotor for a pusher fan propulsion system, a fan for a turbofan propulsion system, or the like. Unless otherwise stated herein, the present disclosure is not limited to any particular turbine engine 24 configuration, or any propulsor rotor 22 configuration.

The turbine engine 24 extends axially along an axis 30 between an upstream, forward end and a downstream, aft end. The turbine engine 24 includes a compressor section 32, a combustor section 34, and a turbine section 36. A reduction gearbox 38 provides drive communication between the engine 24 and the propulsor rotor 22. A core flow path 40 extends sequentially through the compressor section 32, the combustor section 34, and the turbine section 36. Air enters the turbine engine 24 through an airflow inlet 42 and enters the core flow path 40 within the compressor section 32. Air and fuel are mixed and combusted in the combustor section 34. Gaseous combustion products and excess air pass through the turbine section 36 and thereafter enter the exhaust gas condenser 28. As indicated above, the present disclosure is not limited to any particular turbine engine 24 configuration and the aforesaid description of the core flow path 40 and engine component positioning is for illustration purposes and is not intended to be limiting.

Embodiments of the present disclosure propulsion system 20 may include a turbine engine 24 configured to combust non-hydrocarbon fuels (e.g., hydrogen or "$H_2$"), or hydrocarbon fuels (e.g., aviation fuel), or some mixture thereof. For example, the turbine engine 24 within a present disclosure system embodiment may be configured to combust a fuel that is 100% non-hydrocarbon (e.g., 100% $H_2$), or a fuel that is 100% hydrocarbon (e.g., 100% aviation fuel), or a mixture thereof (e.g., a mixture of $H_2$ and aviation fuel). The present disclosure is not limited to any combusting any particular fuel. In those embodiments wherein the present disclosure system 20 combusts hydrogen, the fuel source 26 may be configured to store the hydrogen in liquid form and the present disclosure system 20 may be configured to process the hydrogen to a form (e.g., phase change to a gaseous phase) acceptable for combustion.

The combustion products generated by the combustion of the fuel-air mixture within the combustor section 34 include water ($H_2O$) vapor. The water vapor may be a product of the combustion of a non-hydrocarbon fuel, or the product of water injected into the engine that is vaporized during operation, or any combination thereof. As will be detailed herein, the exhaust gas condenser 28 portion of the present disclosure system 20 is configured to recover at least some of the water vapor produced by the combustion of the fuel-air mixture within the combustor section 34.

Figure 2:
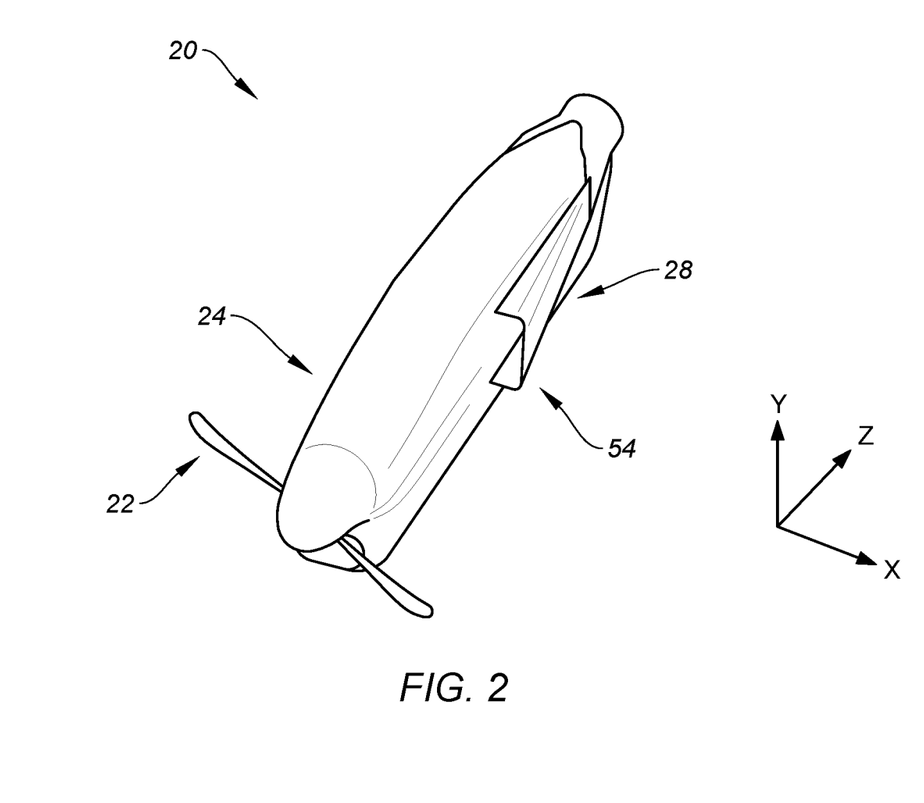
FIG. 2 is a diagrammatic perspective view of a present disclosure propulsion system.
Figure 3:
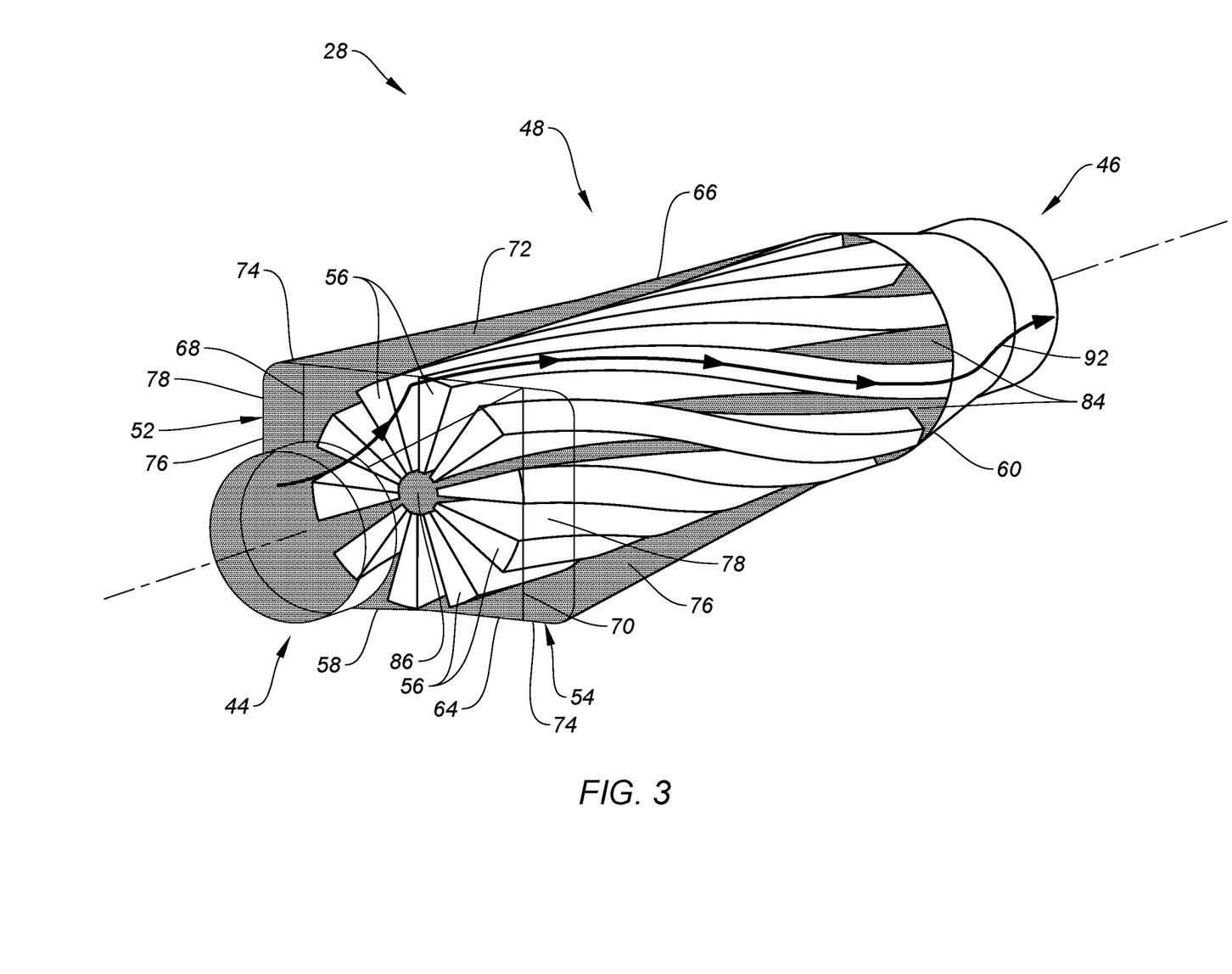
FIG. 3 is a diagrammatic perspective view of a present disclosure exhaust gas condenser embodiment.
Figure 4:
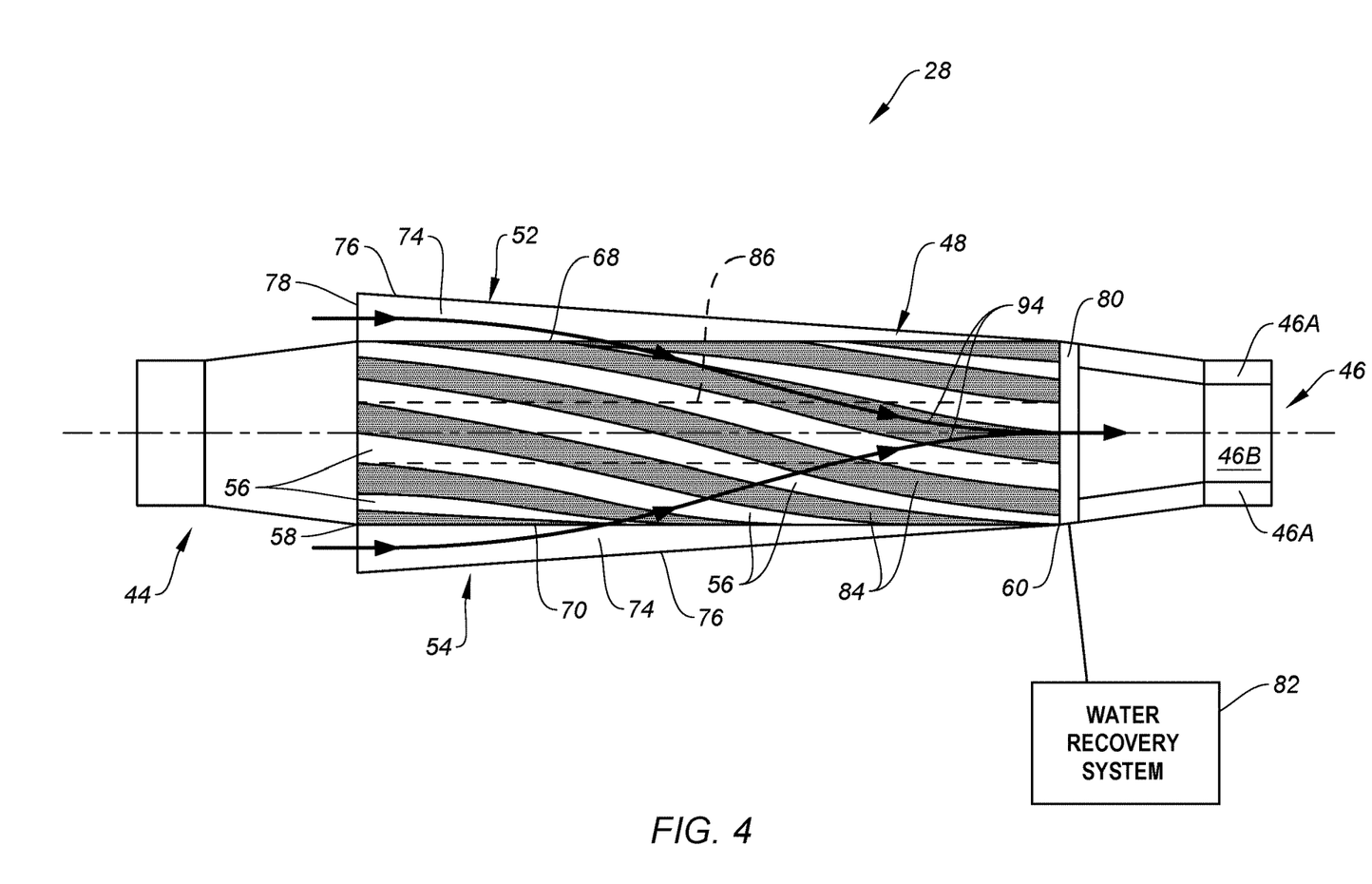
FIG. 4 is a diagrammatic top view of a present disclosure exhaust gas condenser embodiment.
Figure 5:
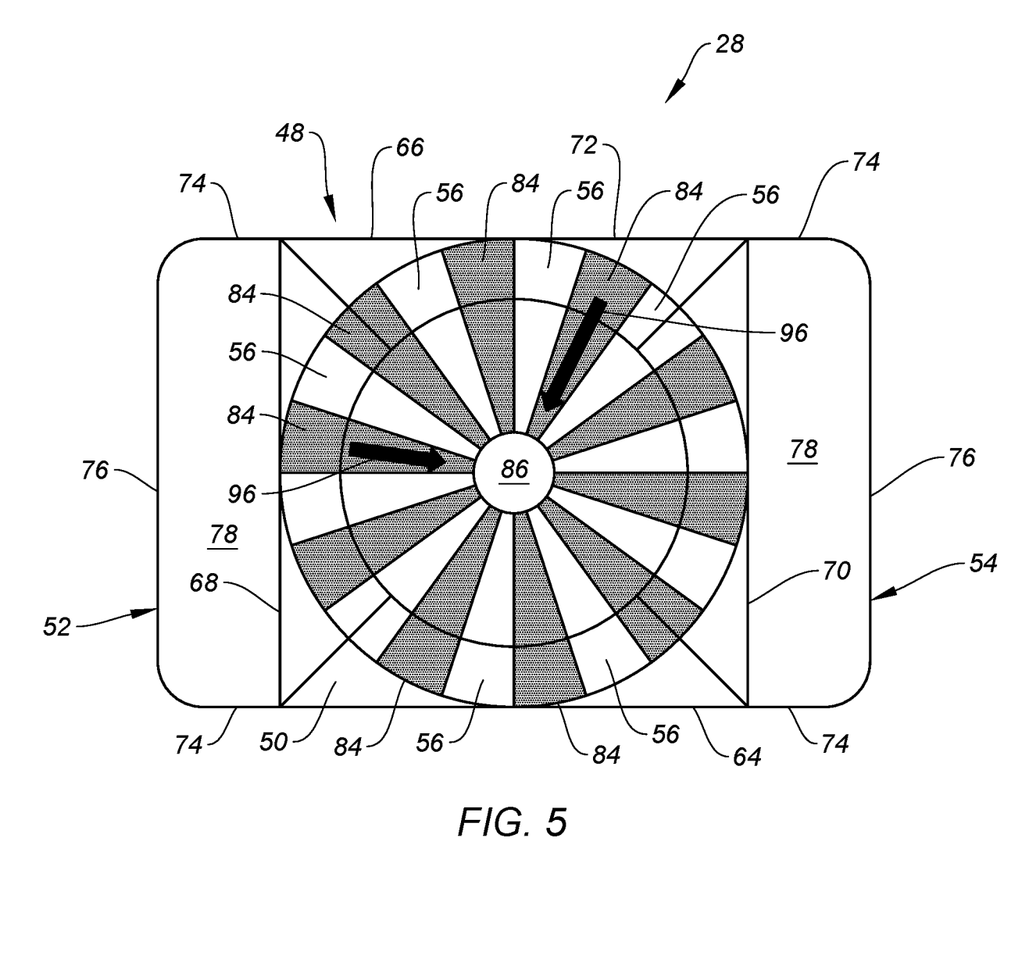
FIG. 5 is a diagrammatic end view of a present disclosure exhaust gas condenser embodiment.

FIG. 2 diagrammatically illustrates a present disclosure aircraft propulsion system 20 with a turbine engine 24 enclosed within a housing that is disposed forward of an aircraft exhaust gas condenser 28. FIG. 3 is a diagrammatic perspective view of a present disclosure exhaust gas condenser 28. FIG. 4 is a diagrammatic top view of a present disclosure exhaust gas condenser 28. FIG. 5 is a diagrammatic end view of a present disclosure exhaust gas condenser 28, wherein the view is in the direction forward to aft.

Figure 6:
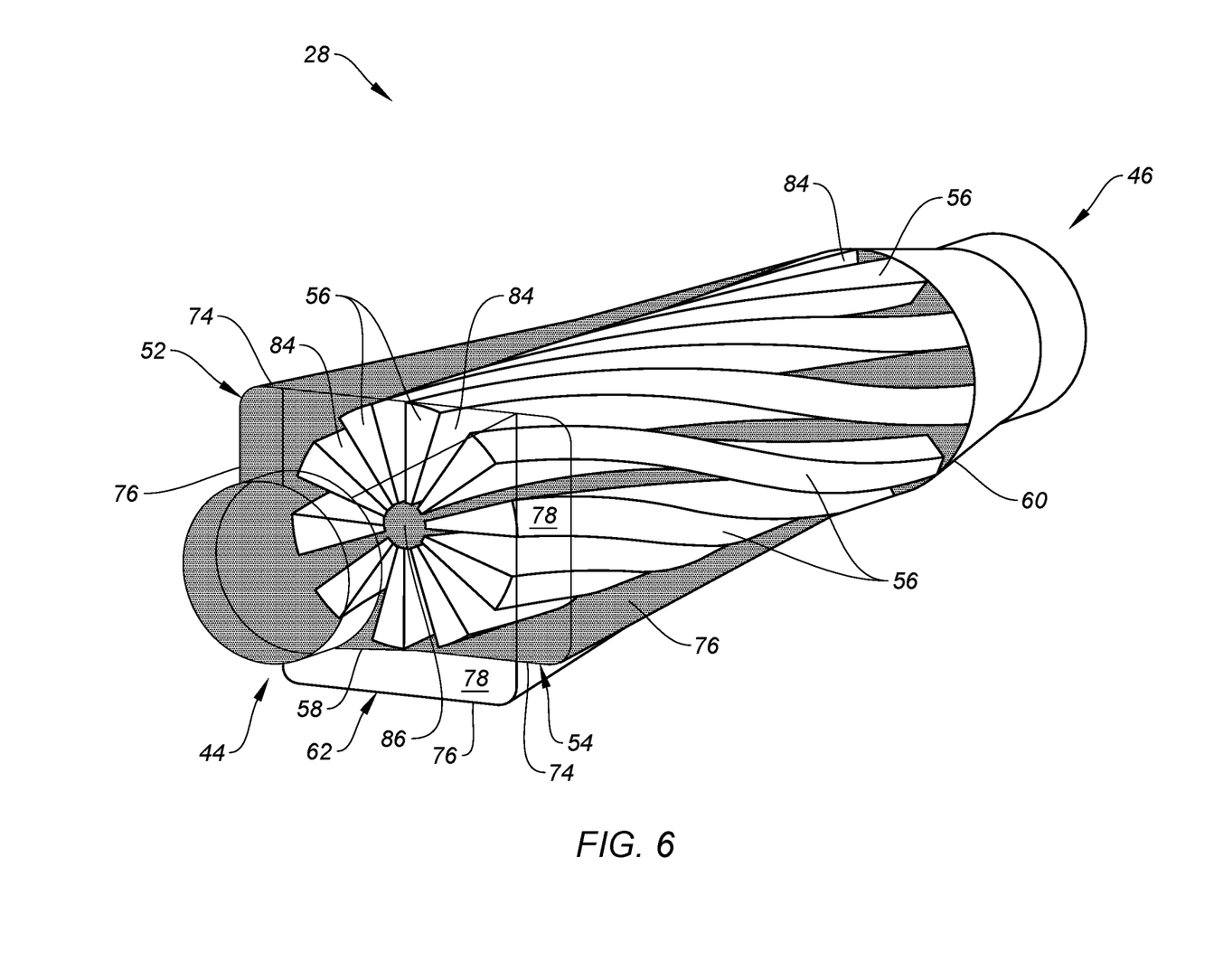
FIG. 6 is a diagrammatic perspective view of an embodiment of the present disclosure exhaust gas condenser.

Referring to FIGS. 3-5, the exhaust gas condenser 28 extends along a central axis (e.g., coincident with the engine axis 30) between an exhaust gas inlet 44 and a nozzle 46. The exhaust gas condenser 28 includes a housing 48, a housing interior cavity 50, a first lateral side air scoop 52, a second lateral side air scoop 54, and a bank of exhaust gas conduits 56. The exhaust gas inlet 44 is disposed at a forward end 58 of the housing 48 and the nozzle 46 is disposed at an aft end 60 of the housing 48. FIG. 6 illustrates an embodiment of the present disclosure exhaust gas condenser 28 that includes a bottom side air scoop 62.

In the embodiment shown in FIGS. 3-5, the exhaust gas condenser housing 48 has a generally rectangular configuration having a width (X-axis), a height (Y-axis), and a length (Z-axis). The cross-section geometry of the condenser housing 48 (e.g., in the X-Y plane) is generally square. In this configuration, the condenser housing 48 may be described as having a bottom side 64 and a top side 66 opposite one another, and a first lateral side 68 and a second lateral side 70 opposite one another. The housing interior cavity 50 is defined by the bottom, top, first lateral, and second lateral sides 64, 66, 68, 70. The housing 48 includes a top side panel 72 that extends lengthwise between the forward and aft ends 58, 60, and widthwise between the first and second lateral sides 68, 70. In some embodiments, the housing 48 may include a bottom side panel that extends lengthwise between the forward and aft ends 58, 60 and widthwise between the first and second lateral sides 68, 70. In some embodiments, the condenser housing 48 may include lateral side panels that allow bypass air passage therethrough (e.g., via one or more apertures) and that provide structural support. In some embodiments (e.g., see FIG. 6), the condenser housing 48 may include a bottom side panel that allows bypass air passage therethrough (e.g., via one or more apertures) and that provide structural support. The condenser housing 48 does not require side panels for those sides that include an air scoop 52, 54, 62.

In the embodiment shown in FIGS. 3-5, the lateral side air scoops 52, 54 each extend lengthwise for substantially the entire length of the condenser housing 48. The first lateral side air scoop 52 is disposed on the first lateral side 68 of the housing 48 and the second lateral side air scoop 54 is disposed on the second lateral side 70 of the housing 48. FIGS. 3-5 show the first and second lateral side air scoops 52, 54 each having a generally rectangular cross-sectional configuration, defined by a pair of side panels 74 and an outer panel 76. The present disclosure is not limited to air scoops 52, 54, 62 with a rectangular configuration; e.g., the air scoops 52, 54, 62 may be arcuately shaped. The first and second lateral side air scoops 52, 54 each include an opening 78. The openings 78 may be disposed proximate to the forward end 58 of the condenser housing 48. Each respective opening 78 may be defined by a respective plane that extends between the housing 48 (e.g., a respective lateral side 68, 70 of the housing 48) and the outer panel 76 and sides 74 of the respective air scoop 52, 54; e.g., the opening planes may be disposed in the X-Y plane. The present disclosure is not limited to the aforesaid scoop opening 78 orientation. The air scoops 52, 54 taper inwardly toward the central axis 30 of the condenser 28 in the direction from forward to aft. In this manner, the cross-sectional flow area of each air scoop 52, 54, 62 decreases in the direction from forward to aft. In the embodiment shown in FIGS. 3-5, the outer panel 76 of the respective air scoops 52, 54 are shown extending linearly. Alternatively, the outer panel of the respective air scoop 52, 54 may extend arcuately. As stated above, in the embodiment shown in FIGS. 3-5 the air scoops 52, 54 each extend lengthwise for substantially the entire length of the condenser housing 48 and are shown enclosing the entire respective side of the condenser housing 48. The present disclosure is not limited to this configuration. For example, one or both of the side lateral air scoops 52, 54 may extend lengthwise for less than the entire length of the condenser housing 48 and/or may enclose less than the entire respective side of the condenser housing 48. In those embodiments that include a bottom air scoop 62 (e.g., see FIG. 6), the bottom air scoop 62 may be configured in a manner similar to that described above for the lateral side air scoops 52, 54.

Figure 9:
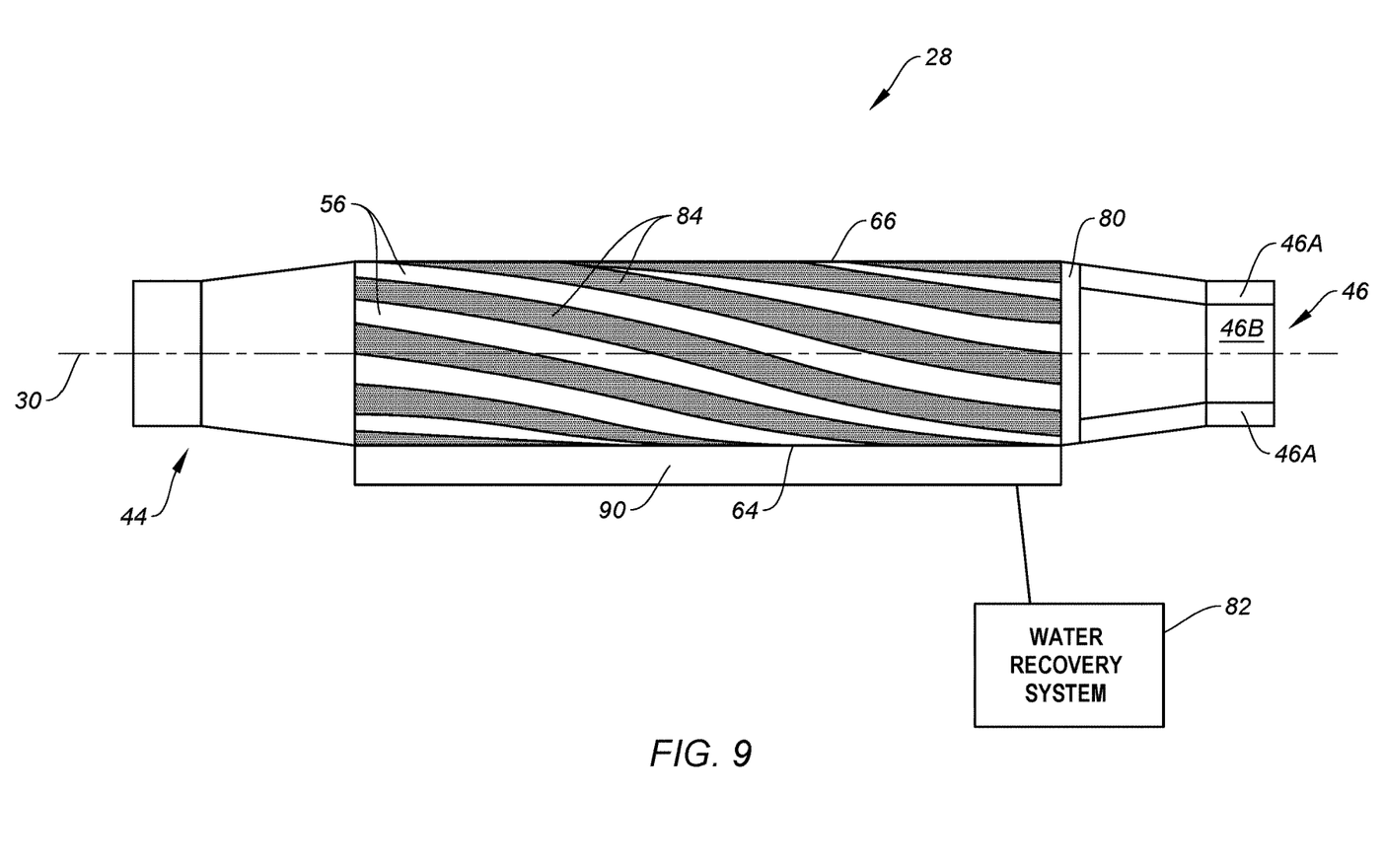
FIG. 9 is a diagrammatic side view of an embodiment of present disclosure exhaust gas condenser.

The bank of exhaust gas conduits 56 is disposed within the housing interior cavity 50. The bank of exhaust gas conduits 56 includes a plurality of exhaust gas conduits 56 that extend spirally between the forward and aft ends 58, 60 of the housing 48. The exhaust gas conduits 56 are open at the forward end 58 to receive turbine engine exhaust gas. The degree to which an exhaust gas conduit 56 spirals between the forward and aft ends can be varied to suit the application at hand. For example, in some embodiments the exhaust gas conduits 56 may each spiral a single revolution between the forward and aft ends. In other embodiments, the exhaust gas conduits 56 may spiral more than one revolution between the forward and aft ends; e.g., more than one full revolution, but less than two full revolutions, or more than two revolutions, or more than three revolutions, and the like. The present disclosure is not limited to the exhaust gas conduits 56 spiraling any particular number of revolutions, or portions of a revolution. At the aft end 60, the exhaust gas conduits 56 may be in fluid communication with a manifold 80 that directs the exhaust gas into the nozzle 46. Alternatively or in addition, the exhaust gas conduits 56 may be in fluid communication with a collection basin 90 disposed at the bottom side 64 of the condenser 28 (see FIG. 9—second lateral side scoop 54 removed to facilitate view). The spiraling of the exhaust gas conduits 56 and the positioning of the collection basin 90 gravitationally below the bank of exhaust gas conduits 56 may provide a liquid collection path; e.g., via drains extending to the collection basin 90. As will be detailed herein, in some embodiments the manifold 80 and/or the collection basin 90 is in communication with a water recovery system 82.

Referring to FIG. 4, in some embodiments the nozzle 46 includes an annular exhaust gas portion 46A and a bypass air portion 46B. The bypass air portion 46B is disposed radially inside of the annular exhaust gas portion 46A.

The exhaust gas conduits 56 are spaced apart from one another such that a passage (e.g., a "bypass air passage 84") is disposed between each adjacent pair of exhaust gas conduits 56. The exhaust gas conduits 56 may be closed to provide a spirally extending enclosed passage for exhaust gas that also extends axially between the forward and aft ends 58, 60 of the condenser housing 48. The spirally extending exhaust gas conduits 56 and bypass air passages 84 extend radially between an outer radial periphery of the bank of exhaust gas conduits 56 and a center collection channel 86. Hence, the center collection channel 86 is disposed radially inward of the conduits 56 and passages 84. The center collection channel 86 extends axially between the forward and aft ends 58, 60 and is in communication with the nozzle bypass air portion 46B. As will be detailed herein, the closed exhaust gas conduits 56 keep the exhaust gas separate (i.e., fluidly isolated from) from bypass air traveling through the bypass air passages 84. FIGS. 3-6 diagrammatically illustrate the alternating exhaust gas conduits 56 and bypass air passages 84.

The present disclosure is described herein as having an exhaust gas condenser 28 that includes exhaust gas conduits 56 and bypass air passages 84. In alternative embodiments, the present disclosure may include bypass air conduits and exhaust gas passages disposed in the alternating manner described herein.

Figure 7:
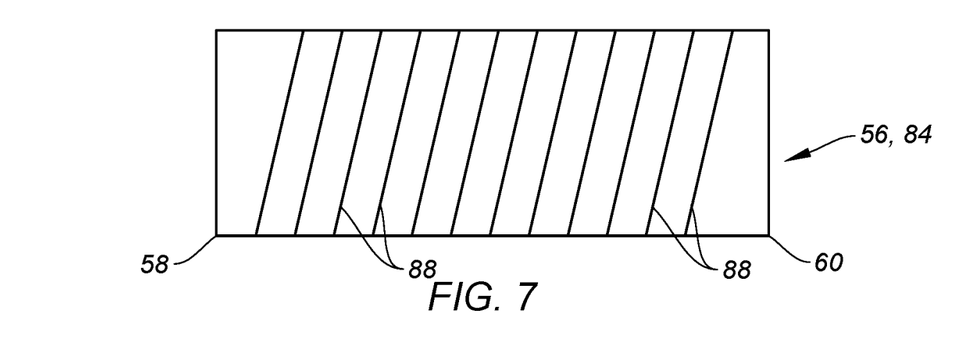
FIG. 7 is a diagrammatic planar view of an exhaust gas conduit/bypass air passage showing features disposed in the flow path.
Figure 7A:
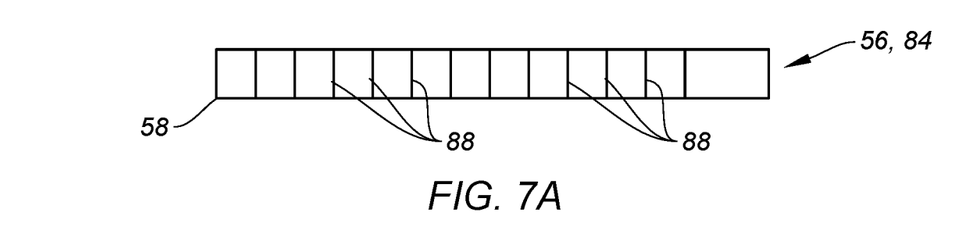
FIG. 7A is a diagrammatic side view of the exhaust gas conduit/bypass air passage shown in FIG. 7
Figure 8:
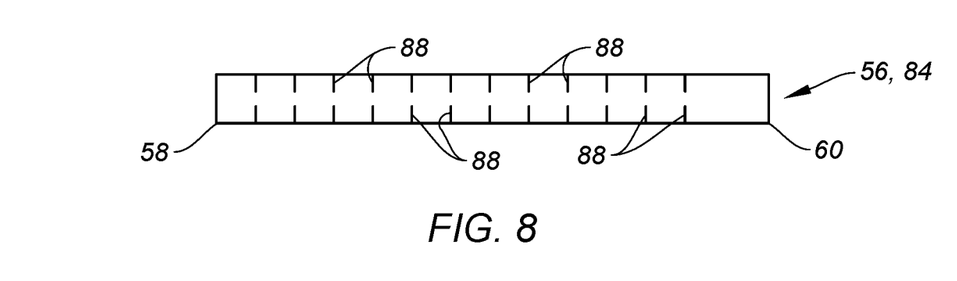
FIG. 8 is a diagrammatic side view of an exhaust gas conduit/bypass air passage configuration showing features disposed in the flow path.

Referring to FIGS. 7, 7A, and 8, in some embodiments features 88 (e.g., fins, pins, ribs, and the like) may be included that extend into the flow path defined by the exhaust gas conduit 56 and/or a bypass air passage 84. FIGS. 7, 7A, and 8 diagrammatically illustrate a flow path representative of an exhaust gas conduit 56 or a bypass air passage 84 in an "un-spiraled" planar view to facilitate the description herein. The features 88 may be configured to increase heat transfer, or to provide structural reinforcement, or to function as a flow guide, or any combination thereof. The features 88 may extend entirely across the flow path, or may extend into the flow path but not entirely across the flow path. Embodiments of the present disclosure may include only a single type of feature 88, or may include a plurality of different types of features 88; e.g., a present disclosure embodiment may include combinations of different types of features 88 (ribs, fins, etc.) and different feature 88 configurations (e.g., features 88 that extend entirely across the flow path, features 88 that extend a limited distance into the flow path, and the like). The present disclosure does not require the use of features 88, and when features 88 are included, the present disclosure is not limited to any particular type of feature 88.

FIGS. 7 and 7A diagrammatically illustrate an exhaust gas conduit 56 or a bypass air passage 84 having features 88 (e.g., ribs) that extend across the conduit/passage. FIG. 7A diagrammatically illustrates a side view of the conduit 56/passage 84 shown in FIG. 7. FIG. 8 diagrammatically illustrates a side view of a conduit 56/passage 84 having features 88 (e.g., fins) that extend less than entirely across the conduit 56/passage 84. As stated above, any or all of these features 88 may be configured to increase heat transfer, provide structural reinforcement, or function as a flow guide, or any combination thereof. In addition, the present disclosure includes embodiments wherein different features 88 are utilized in concert; e.g., ribs extending completely across a conduit 56/passage 84 configured for flow guidance, fins or pins extending a limited distance in to a conduit 56/passage 84 for heat transfer, and the like. The aforesaid examples are provided to illustrate this aspect of the present disclosure and the not intended to be limiting.

As stated above, the combustion products generated by the combustion of the fuel-air mixture within the combustor section 34 of the turbine engine 24 include water ($H_2O$) vapor and/or water vapor may be present as a result of water injection. The exhaust gas condenser 28 is configured to utilize bypass air to cool the exhaust gas to a degree that causes at least some of the water vapor in the exhaust gas to change from a gaseous phase to a liquid phase. The liquid water is subsequently recovered. In some embodiments, the liquid water may be recovered from the manifold 80 (e.g., see FIG. 4) disposed at the aft end 60 of the condenser 28, or recovered from the collection basin 90 disposed at the bottom side 64 of the condenser 28 disposed gravitationally below the spiraled exhaust gas conduits 56 (see FIG. 9), or the like, or any combination thereof. In some applications, and in particular when the condenser 28 has exhaust gas conduits 56 that spiral a plurality of revolutions, the exhaust gas passing through the spiraled exhaust gas conduits 56 may be subject to centrifugal forces that facilitate separation of the liquid component from the gaseous component. The present disclosure is not limited to any particular structure for capturing the liquid water produced within the condenser 28. The recovered water may be used for a variety of different purposes, including injection into turbine engine sections such as the compressor section 32, the combustor section 34, and the turbine section 36, and/or for use in the aircraft cabin. Various uses for water (in liquid or gaseous form) in a turbine engine 24 or an aircraft are known in the art, and the present disclosure is not limited to any particular one thereof.

During operation of the present disclosure aircraft propulsion system 20, the turbine engine 24 is operated to combust a fuel/air mixture to produce power. The produced exhaust gases exit the turbine section 36 and are directed into the exhaust gas inlet 44 of the exhaust gas condenser 28. The exhaust gas is subsequently received within the exhaust gas conduits 56. The exhaust gas travels through the spirally configured exhaust gas conduits 56 and subsequently enters the manifold 80 disposed at the aft end 60 of the condenser housing 48. Arrow 92 (e.g., see FIG. 3) diagrammatically illustrates exhaust gas traveling forward to aft through a spirally configured exhaust gas conduit 56 and subsequently passing out through the nozzle 46 to illustrate a spiral exhaust gas conduit path. Arrows 94 (e.g., see FIG. 4) diagrammatically illustrate bypass air entering air scoops 52, 54, traveling aft and radially inward through spirally configured bypass air passages 84 before entering the central collection channel 86 and subsequently passing out through the nozzle 46 to illustrate a spiral bypass air path. Arrows 96 (e.g., see FIG. 5) diagrammatically illustrate bypass air traveling radially inward through bypass air passages 84. The exhaust gas air subsequently enters and exits the annular exhaust gas portion 46A of the nozzle 46. In some embodiments, the nozzle 46 may be configured such that exhaust gas exiting the annular exhaust gas portion 46A of the nozzle 46 may produce propulsive thrust for a least a portion of the flight operation.

While the aircraft is underway, the ambient air is captured by the air scoops 52, 54, 62 and is directed into the condenser 28. More specifically, the captured air (which may be categorized as "ram air" when the aircraft is underway) is directed radially inward by the tapered air scoops 52, 54, 62 and into the bypass air passages 84. The ambient air travels radially inward and axially within the spiral bypass air passages 84. The temperature of the ambient air is appreciably lower than the temperature of the exhaust gases and acts as a cooling medium within the condenser 28. The bypass air cools the exhaust gas conduits 56 and the cooled exhaust gas conduits 56, in turn, cool the exhaust gases traveling spirally within the bank of exhaust gas conduits 56. The exhaust gases are cooled sufficiently to cause at least some of the water vapor in the exhaust gases to change from a gaseous phase to a liquid phase.

After the bypass air has passed through the bypass air passages 84, the bypass air enters the center collection channel 86 and travels axially, eventually entering the bypass air portion 46B of the nozzle 46. In some embodiments, the nozzle 46 may be configured such that bypass air exiting the bypass air portion 46B of the nozzle 46 may produce propulsive thrust for a least a portion of the flight operation.

The manifold 80, or collection basin 90, or other collection structure capturing the liquid water may be in communication with a water recovery system 82 (e.g., that may include a pump, filters, valves, and the like) that directs the recovered water for use elsewhere as detailed herein.

The present disclosure aircraft propulsion system 20 described herein having an exhaust gas condenser 28 with a plurality of air scoops 52, 54, 62 is configured for convenient placement under the wing of an aircraft.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc. The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. An aircraft propulsion system, comprising:
a turbine engine configured to exhaust gases during combustion; and
an exhaust gas condenser that extends lengthwise along a central axis, the exhaust gas condenser including:
a housing extending lengthwise between a forward end and an aft end, the housing having an interior cavity, a top side, a bottom side opposite the top side, a first lateral side, and a second lateral side opposite the first lateral side, wherein the first lateral side and the second lateral side both extend between the top side and the bottom side;
a nozzle in communication with the housing and disposed at the aft end;
a plurality of air scoops attached to the housing; and
a bank of exhaust gas conduits disposed in the interior cavity of the housing, wherein the bank of exhaust gas conduits includes a plurality of exhaust gas conduits and a plurality of bypass air passages, wherein ones of the plurality of exhaust gas conduits and ones of the plurality of bypass air passages are disposed relative to one another in an alternating configuration; and
a center collection channel disposed radially inside of the bank of exhaust gas conduits, the center collection channel in fluid communication with the nozzle;
wherein the plurality of exhaust gas conduits and the plurality of bypass air passages extend spirally along the central axis between the forward end and the aft end, the plurality of exhaust gas conduits are open at the forward end to receive the exhaust gases from the turbine engine and the plurality of exhaust gas conduits are open at the nozzle; and
wherein each one of said plurality of bypass air passages is in fluid communication with at least one of the plurality of air scoops and each one of the plurality of bypass air passages are in fluid communication with the center collection channel.

2. The aircraft propulsion system of claim 1, wherein the exhaust gas condenser is configured to keep the exhaust gases separate from the bypass air.

3. The aircraft propulsion system of claim 2, wherein the nozzle includes an annular exhaust gas portion and a bypass air portion;
wherein the plurality of exhaust gas conduits are in fluid communication with the annular exhaust gas portion of the nozzle and the annular exhaust gas nozzle portion is configured to maintain the exhaust gases separate from the bypass air within the nozzle; and
wherein the center collection channel is in fluid communication with the bypass air portion of the nozzle and the bypass air portion is configured to maintain the bypass air separate from the exhaust gases within the nozzle.

4. The aircraft propulsion system of claim 1, wherein the plurality of air scoops attached to the housing includes a first lateral side (FLS) air scoop disposed on the first lateral side of the housing, and a second lateral side (SLS) air scoop disposed on the second lateral side of the housing.

5. The aircraft propulsion system of claim 4, wherein the housing has a length, a width, and a height; and
wherein the FLS air scoop has a FLS opening disposed proximate to the forward end, and the FLS air scoop tapers inwardly toward the central axis in a direction from the forward end to the aft end; and
wherein the SLS air scoop has an SLS opening disposed proximate to the forward end, and the SLS air scoop tapers inwardly toward the central axis in a direction from the forward end to the aft end.

6. The aircraft propulsion system of claim 5, wherein the SLS air scoop extends the length of the housing, and the FLS air scoop extends the length of the housing.

7. The aircraft propulsion system of claim 6, wherein the SLS air scoop extends the height of the housing, and the FLS air scoop extends the height of the housing.

8. The aircraft propulsion system of claim 4, wherein the FLS air scoop has a FLS flow area that decreases in a direction from the forward end to the aft end, and the SLS air scoop has an SLS flow area that decreases in a direction from the forward end to the aft end.

9. The aircraft propulsion system of claim 4, wherein the plurality of air scoops attached to the housing includes a bottom side (BS) air scoop disposed on the bottom side of the housing.

10. The aircraft propulsion system of claim 9, wherein the housing has a length, a width, and a height; and
wherein the BS air scoop has a BS opening disposed proximate to the forward end, and the BS air scoop tapers inwardly toward the central axis in a direction from the forward end to the aft end.

11. The aircraft propulsion system of claim 10, wherein the BS air scoop extends the length and width of the housing.

12. The aircraft propulsion system of claim 9, wherein the BS air scoop has a BS flow area that decreases in a direction from the forward end to the aft end.

13. The aircraft propulsion system of claim 1, wherein the exhaust gas condenser further includes a plurality of heat transfer features that extend into one or more of the plurality of exhaust gas conduits.

14. The aircraft propulsion system of claim 12, wherein the plurality of heat transfer features structurally reinforce the one or more of the plurality of exhaust gas conduits.

15. The aircraft propulsion system of claim 1, wherein the exhaust gas condenser further includes at least one flow guidance feature that extends into at least one exhaust gas conduit of the plurality of exhaust gas conduits.

16. The aircraft propulsion system of claim 1, wherein the exhaust gas condenser further includes a plurality of heat transfer features that extend into at least one bypass air passage of the plurality of bypass air passages.

17. The aircraft propulsion system of claim 1, wherein the exhaust gas condenser further includes at least one flow guidance feature that extends into at least one bypass air passage of the plurality of bypass air passages.

18. The aircraft propulsion system of claim 1, the system further comprising a first flow guidance feature that extends into at least one exhaust gas conduit of the plurality of exhaust gas conduits or a second flow guidance feature that extends into at least one bypass air passage of the plurality of bypass air passages.

19. An exhaust gas condenser for an aircraft turbine engine, the exhaust gas condenser extending along a central axis, comprising:
a housing extending lengthwise between a forward end and an aft end, the housing having an interior cavity and a plurality of sides extending between the forward end and aft end;
a nozzle in communication with the housing and disposed at the aft end;
a plurality of air scoops attached to the housing;
a bank of exhaust gas conduits disposed in the interior cavity of the housing, wherein the bank of exhaust gas conduits includes a plurality of exhaust gas conduits and a plurality of bypass air passages, wherein ones of the plurality of exhaust gas conduits and ones of the plurality of bypass air passages are disposed relative to one another in an alternating configuration; and
a center collection channel disposed radially inside of the bank of exhaust gas conduits, the center collection channel in fluid communication with the nozzle;
wherein the plurality of exhaust gas conduits and the plurality of bypass air passages extend spirally along the central axis between the forward end and the aft end, the plurality of exhaust gas conduits are open at the forward end to receive the exhaust gases from the turbine engine and the plurality of exhaust gas conduits are open at the nozzle; and
wherein each one of said plurality of bypass air passages is in fluid communication with at least one of the plurality of air scoops and each one of the plurality of bypass air passages are in fluid communication with the center collection channel.

20. The exhaust gas condenser of claim 19, wherein the plurality of air scoops attached to the housing includes a first lateral side (FLS) air scoop disposed on a first lateral side of the housing, and a second lateral side (SLS) air scoop disposed on a second lateral side of the housing;
wherein the FLS air scoop tapers inwardly toward the central axis in a direction from the forward end to the aft end; and
wherein the SLS air scoop tapers inwardly toward the central axis in a direction from the forward end to the aft end.

* * * * *